United States Patent
Cone et al.

(10) Patent No.: US 8,468,825 B1
(45) Date of Patent: *Jun. 25, 2013

(54) METHOD FOR PRODUCING SHAFT HORSEPOWER USING WASTE HEAT

(75) Inventors: Robert E. Cone, Houston, TX (US); Mitzi Jones Gass, Missouri City, TX (US); Matthew Wayne Wishert, Magnolia, TX (US)

(73) Assignee: Maxim Silencers, Inc., Stafford, TX (US)

( * ) Notice: Subject to any disclaimer, the term of this patent is extended or adjusted under 35 U.S.C. 154(b) by 178 days.

This patent is subject to a terminal disclaimer.

(21) Appl. No.: 13/033,063

(22) Filed: Feb. 23, 2011

Related U.S. Application Data (60) Provisional application No. 61/307,948, filed on Feb. 25, 2010.

(51) Int. Cl.
| | |
|---|---|
| *F02G 3/00* | (2006.01) |
| *F01K 23/10* | (2006.01) |
| *F01N 13/00* | (2010.01) |
| *F01N 99/00* | (2010.01) |
| *F01N 1/08* | (2006.01) |
| *F28F 13/00* | (2006.01) |

(52) U.S. Cl.
USPC .............. 60/614; 60/616; 60/618; 181/238; 181/273; 165/135

(58) Field of Classification Search
USPC ................ 60/614, 616, 618, 641, 645–683, 60/320; 165/135
See application file for complete search history.

(56) References Cited

U.S. PATENT DOCUMENTS

| | | | | |
|---|---|---|---|---|
| 1,715,630 | A * | 6/1929 | Snell | 165/51 |
| 5,016,438 | A * | 5/1991 | Harris | 60/299 |
| 5,578,277 | A * | 11/1996 | White et al. | 422/180 |
| 5,746,986 | A * | 5/1998 | Pollock et al. | 422/177 |
| 7,469,540 | B1 * | 12/2008 | Knapton et al. | 60/618 |
| 8,069,660 | B1 * | 12/2011 | Cone et al. | 60/320 |
| 8,069,666 | B1 * | 12/2011 | Cone et al. | 60/618 |
| 2007/0274877 | A1 * | 11/2007 | Bush et al. | 422/176 |
| 2008/0236616 | A1 * | 10/2008 | Bloch | 134/2 |
| 2009/0038302 | A1 * | 2/2009 | Yamada et al. | 60/320 |
| 2010/0043413 | A1 * | 2/2010 | Orihashi et al. | 60/320 |

FOREIGN PATENT DOCUMENTS
WO  WO 2007105815 A1 *  9/2007

\* cited by examiner

*Primary Examiner* — Thomas Denion
*Assistant Examiner* — Steven D Shipe
(74) *Attorney, Agent, or Firm* — Buskop Law Group, PC; Wendy Buskop (57) ABSTRACT

One or more methods for generating electricity using waste heat are provided herein. The method can include providing an exhaust gas to a first silencing chamber within an inner housing of a heat recovery silencer, flowing the exhaust gas from the first silencing chamber to a second silencing chamber within the inner housing, flowing the exhaust gas from the second silencing chamber to a third silencing chamber within the inner housing and imparting a spiral flow path to the exhaust gas as the exhaust gas enters the third silencing chamber.

16 Claims, 6 Drawing Sheets

METHOD FOR PRODUCING SHAFT HORSEPOWER USING WASTE HEAT

CROSS REFERENCE TO RELATED APPLICATIONS

The present application claims priority to and the benefit of U.S. Provisional Application Ser. No. 61/307,948 filed on Feb. 25, 2010, entitled: "METHOD FOR PRODUCING SHAFT HORSEPOWER USING WASTE HEAT". This reference is incorporated in its entirety herein.

FIELD

The present embodiments generally relate to a method for producing electricity using a heat recovery silencer.

BACKGROUND

A need exists for a system and method of producing electricity using a heat recovery silencer that can recover waste heat from a first combustion system in an efficient manner.

A further need exists for a method and system for producing electricity that uses a heat recovery silencer that can acquire waste heat from a combustion source performing a first process and eliminate the need for a second combustion system to create electricity for another process, which eliminates unnecessary emissions. Furthermore, there is a need for a system that utilizes an efficient heat recovery silencer that eliminates the need for multiple combustion systems to prevent unnecessarily unsafe working conditions.

In addition, there is a need for a system that utilizes a heat recovery silencer that muffles or silences sound emanating from the exhaust system of the first combustion system.

The present embodiments meet these needs.

BRIEF DESCRIPTION OF THE DRAWINGS

The detailed description will be better understood in conjunction with the accompanying drawings as follows.

The present embodiments are detailed below with reference to the listed Figures.

DETAILED DESCRIPTION OF THE EMBODIMENTS

Before explaining the present method in detail, it is to be understood that the method is not limited to the particular embodiments and that it can be practiced or carried out in various ways.

The present embodiments relate to a method for recovering waste heat from one or more combustion systems and using the waste heat to generate electricity.

One or more embodiments of the method can include integrating a heat recovery silencer with or connecting a heat recovery silencer to a boiler or engine of a back up electric generation system for a building or facility. The heat recovery silencer can be used to provide waste heat to a heat transfer fluid to create steam or heated vapor for driving a turbine to generate shaft horsepower that can be used to generate electricity.

One or more embodiments of the method can include integrating or connecting a heat recovery silencer with a furnace or other combustion source in a chemical plant and using the heat recovery silencer to provide heat to a heat transfer fluid to transform the heat transfer fluid to a heated vapor. The heated vapor can drive a turbine to generate shaft horsepower that can be used to generate electricity for a second portion of the chemical plant.

One or more embodiments of the method for generating shaft horsepower using waste heat from combustion exhaust can include flowing a heated vapor from a heat recovery flow path formed between an inner housing and a heat recovery outer housing of a heat recovery silencer to a turbine.

The heated vapor can be expanded in the turbine to produce shaft horsepower and a low pressure vapor stream. The low pressure stream can flow to a condenser. The condenser can transform the low pressure stream into a heat transfer fluid. The heat transfer fluid can be pumped to the heat recovery flow path.

An exhaust from a combustion system can be provided to the inner housing. Waste heat from the exhaust in the inner housing can be used to heat the heat transfer fluid to form the heated vapor.

The first silencing chamber can be in fluid communication with an inlet of the inner housing. For example, exhaust gas from a combustion system can flow into the inlet of the first silencing chamber and then flow into the inner housing. In one or more embodiments, the first housing can have an inlet remote or adjacent the first silencing chamber, and the inlet can be in communication with the combustion system and the first chamber. For example, one or more flow paths can be provided between the inlet of the inner housing and the first chamber by one or more openings formed in the inner housing. In one or more embodiments, one or more additional chambers or devices can be integrated or connected with the inner housing.

The second silencing chamber can be in fluid communication with the first silencing chamber. For example, a flow path or communication path can be formed between the first silencing chamber and the second silencing chamber by one or more tubes, channels, valves, ports, or any combination thereof. In one or more embodiments, one or more baffle tubes can be in fluid communication with the first silencing chamber and the second silencing chamber and provide fluid communication therebetween.

The third silencing chamber can be in fluid communication with two or more vectoring tubes. The vectoring tubes can be in fluid communication with the second silencing chamber. Accordingly, fluid or gas, such as exhaust from a combustion system, can flow from the second silencing chamber to the third silencing chamber through the vectoring tubes.

The vectoring tubes can provide spiraling flow to the gas or fluid flowing therethrough. The vectoring tubes can prevent or minimize back pressure to the third silencing chamber. The third silencing chamber and second silencing chamber can be in fluid communication with from about 2 to about 100 vectoring tubes. For example, two vectoring tubes can be used to provide fluid communication between the third silencing chamber and the second silencing chamber. Accordingly, the contact between the gas or fluid and the inner surface of the inner housing in the third chamber can be optimized or maximized.

A vent can be in fluid communication with the third silencing chamber and an environment exterior thereto. The vent can include one or more flow control devices for controlling the rate of gas or fluid allowed to flow therethrough. The exterior of environment can be the atmosphere.

The heat recovery outer housing can be disposed about the inner housing. In one or more embodiments, the outer housing can encapsulate the inner housing.

The heat recovery flow path, such as a channel, space, or chamber, can be formed between the heat recovery outer housing and the inner housing.

In one or more embodiments, the first silencing chamber can be in fluid communication with a conduit, such as a half pipe. The conduit can also be in fluid communication with the third silencing chamber. Accordingly, the conduit can provide a flow path between the first silencing chamber and the third silencing chamber for at least a first portion of the gas or fluid such as exhaust in the first chamber. The conduit can help maintain a differential pressure between the third silencing chamber and the first silencing chamber. As such, a second portion of the gas or fluid, which can be larger than the first portion of the gas or fluid, will be able to flow from the first silencing chamber to the second silencing chamber, and from the second silencing chamber to the third silencing chamber.

The conduit can be secured to an outer surface of the inner housing, and an exterior portion of the conduit can be disposed or located within the heat recovery flow path. As such, the conduit can also maximize or increase the heat transferred from the gas or fluid in the inner housing with a gas or fluid in the heat recovery flow path.

In one or more embodiments, the heat recovery silencer can include a diffuser adjacent or in fluid communication with the first silencing chamber. The diffuser can provide a velocity drop and a direction change to the gas or fluid as the gas or fluid enters the heat recovery silencer.

The heat recovery silencer can also include a diffusion chamber disposed between the diffuser and the first silencing chamber. The diffusion chamber can be in fluid communication with the diffuser and the first silencing chamber.

In addition, one or more embodiments of the heat recovery silencer can be or include a catalyst element disposed or located between the diffuser chamber and the first silencing chamber. The catalyst element can be in fluid communication with the first silencing chamber and the diffuser chamber.

The catalyst element includes the catalyst device and the catalyst housing.

The catalyst device can be a plurality of sheets having a catalyst coating. The sheets can be wrapped around one another and a space can be formed between the sheets to allow exhaust gas or fluid to flow therebetween.

The catalyst device can include a metal group catalyst. The metal group catalyst can include platinum, ruthenium, palladium, or other metal group catalysts.

In an embodiment, the catalyst device can include a plurality of layers of metal group catalyst and a space or flow area can be located between each layer.

The catalyst element can receive a gas or fluid flowing from the combustion system to the first silencing chamber and provide a catalytic reduction or reaction to the gas or fluid flowing therethrough. The catalytic reaction can reduce NOX gas, volatile organic compounds, formaldehyde, or combinations thereof in the gas or fluid.

The catalyst housing can include an opening and an access cover disposed over the opening. The access cover can be mounted to the catalyst housing with a hinge. In addition, the catalyst housing can have a radius of curvature and the access cover can have a radius of curvature allowing the access cover to fit over at least a portion of the catalyst housing and seal the opening.

The catalyst housing can include four moveable pressure sealing bars, a catalyst element seating ring formed into the catalyst housing, and a seal plate. The four movable pressure sealing bars can be configured to push the catalyst device against the seal plate to form a pressure seal, which causes the exhaust gas to only flow through the catalyst element.

The heat recovery silencer can silence or muffle noise associated with a combustion exhaust system. In addition, the heat recovery silencer can reduce risks associated with multiple combustion systems by efficiently removing waste heat from exhaust gas of a combustion system, which allows waste heat to be used to generate electricity.

The heat recovery silencer can silence or muffle noise associated with a combustion exhaust system. In addition, the heat recovery silencer can reduce risks associated with multiple combustion systems by efficiently removing waste heat from exhaust gas of a combustion system, which allows waste heat to be used to generate electricity.

Figure 1:
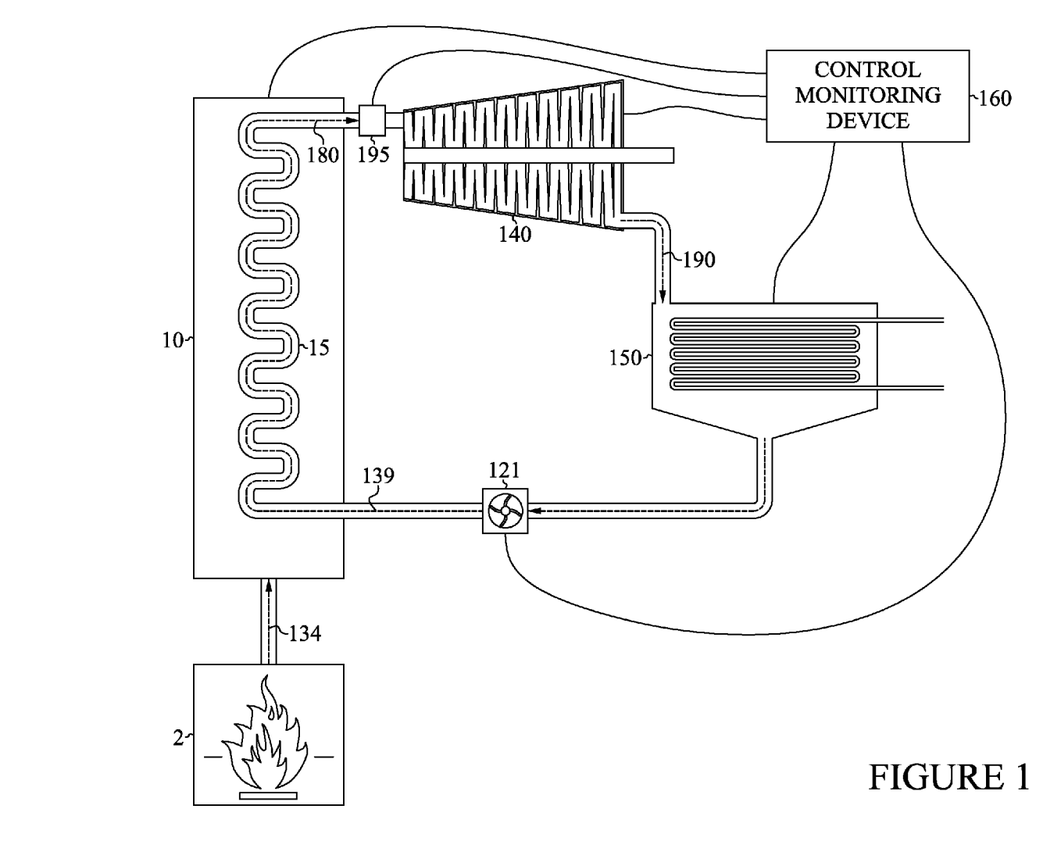
FIG. 1 depicts a schematic of an illustrative system for producing shaft horsepower according to one or more embodiments

Turning now to the Figures, FIG. 1 depicts a schematic of an illustrative system for creating electricity by using a heat recovery silencer 10 according to one or more embodiments. The system can include the heat transfer silencer 10, a high pressure pump 121, a combustion system 2, a turbine 140, a condenser 150, and a control system 160 in communication with at least one of the heat transfer silencer 10, the high pressure pump 121, the combustion system 2, the turbine 140, and the condenser 150.

The combustion system 2 can be a system used to perform a first task. For example, the combustion system 2 can be a combustor for burning methane recovered from a land fill, an engine used to create energy for a building or municipality, or similar devices or systems.

The combustion system 2 can have an exhaust system 132, such as a chimney, in fluid communication with the heat recovery silencer 10.

In one or more embodiments, the heat recovery silencer 10 can have an inner housing 12. A heat recovery outer housing 16 can be disposed about the inner housing 10, and a heat recovery flow path 15 can be formed therebetween. The heat recovery flow path 15 can be in fluid communication with the high pressure pump 121 and the turbine 140.

The high pressure pump 121 can be an electrical pump or a hydraulic pump. The high pressure pump 121 can provide a pump head of about 20 psig to about 180 psig. For example, the high pressure pump 121 can provide a pump head of about 150 psig.

The turbine 140 can be any turbine that produces shaft horsepower while expanding heated vapor to a low pressure vapor stream. For example, the turbine 140 can be a turbo expander. The turbine 140 can be configured to produce a shaft horsepower ranging from about 20 horsepower to about 350 horsepower. The turbine 140 can be in fluid communication with the condenser 150.

The condenser 150 can be any condenser used in the art.

In operation, the inner housing 12 of the heat recovery silencer 10 can be in fluid communication with the combustion system 2. As such the inner housing 12 can receive an exhaust gas 134 from the combustion system 2.

The heat recovery flow path 15 can have a heat transfer fluid 139 flowing therein.

The heat transfer fluid 139 can be treated water, biomedia, refrigerants, or combinations thereof. The biomedia can be a propane, a butane, a heptane, a nonane, an octane, or combinations thereof. The treated water can be deionized water, water treated with corrosion inhibitors, reverse osmosis water, or combinations thereof.

Accordingly, the heat transfer fluid 139 can be heated by indirect heat exchange from the exhaust gas 134 flowing within the inner housing 12. The heat transfer fluid 139 can flow in the heat recovery flow path 15 in a direction that is the same or counter to the flow of the exhaust gas 134 in the inner housing. The heat transfer fluid 139 can be transformed or heated to a heated vapor 180 as it flows through the heat recovery flow path 15.

The heated vapor 180 can exit the heat recovery silencer 10 and flow to the turbine 140. The flow rate of the heated vapor 180 to the turbine 140 can be controlled by a flow control device 195. The flow control device 195 can be one or more valves, such as butterfly valves. As the heated vapor 180 flows through the turbine 140 the heated vapor 180 can create shaft horsepower and expand to a low pressure vapor stream 190.

The low pressure stream 190 can flow to the condenser 150, and the condenser 150 can transform the low pressure vapor stream 190 back to the heat transfer fluid 139. Accordingly, the heat transfer fluid 139 can be re-circulated back to the heat recovery flow path 15 by the high pressure pump 121.

The control system 160 can acquire data related to the system, while controlling one or more components of the system at the same time. For example, the control system 160 can measure the flow rate of the heat transfer fluid out of the condenser 150, the flow rate of heated vapor from the heat recovery silencer 10, the shaft horsepower produced by the turbine 140, and the pressure of the high pressure pump 121. In addition, the control system 160 can control the flow rate of the heated vapor 180 to the turbine 140 by adjusting the flow control device 195.

Figure 2:
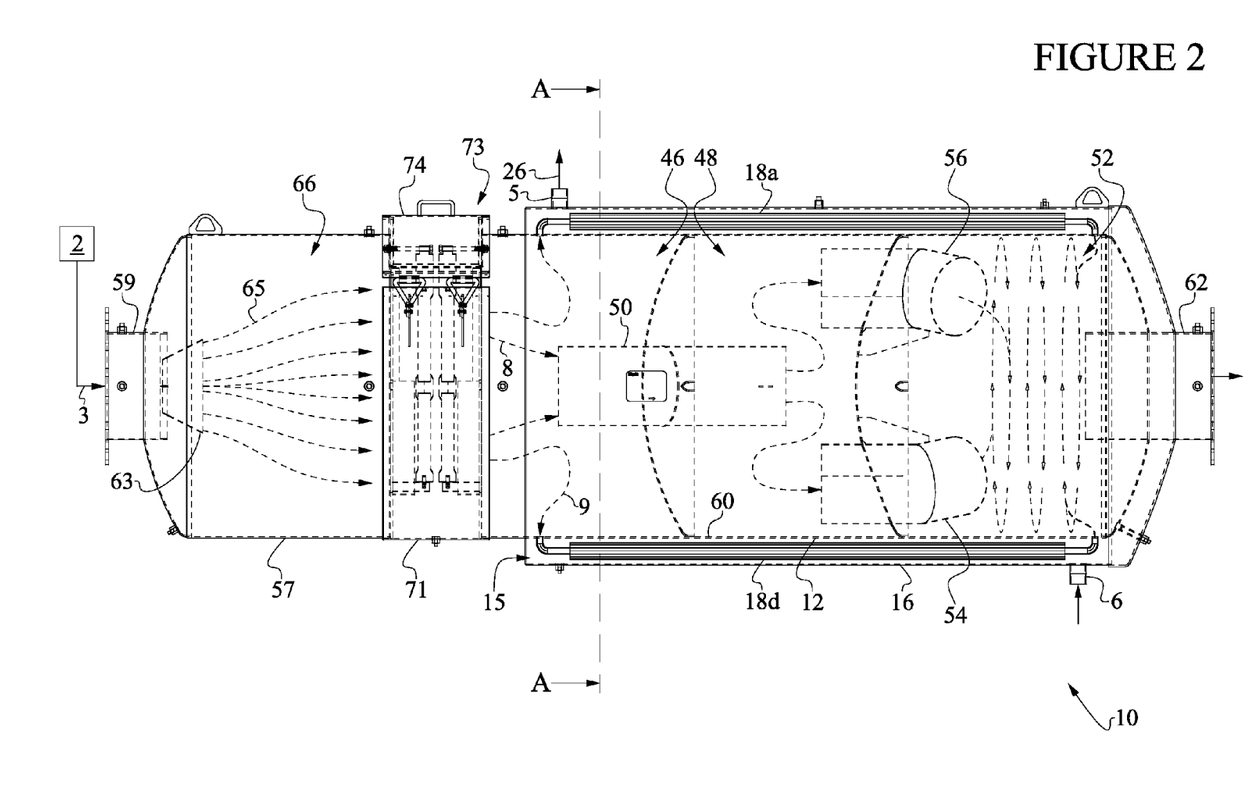
FIG. 2 depicts a side view of an illustrative heat recovery silencer according to one or more embodiments.
Figure 3:
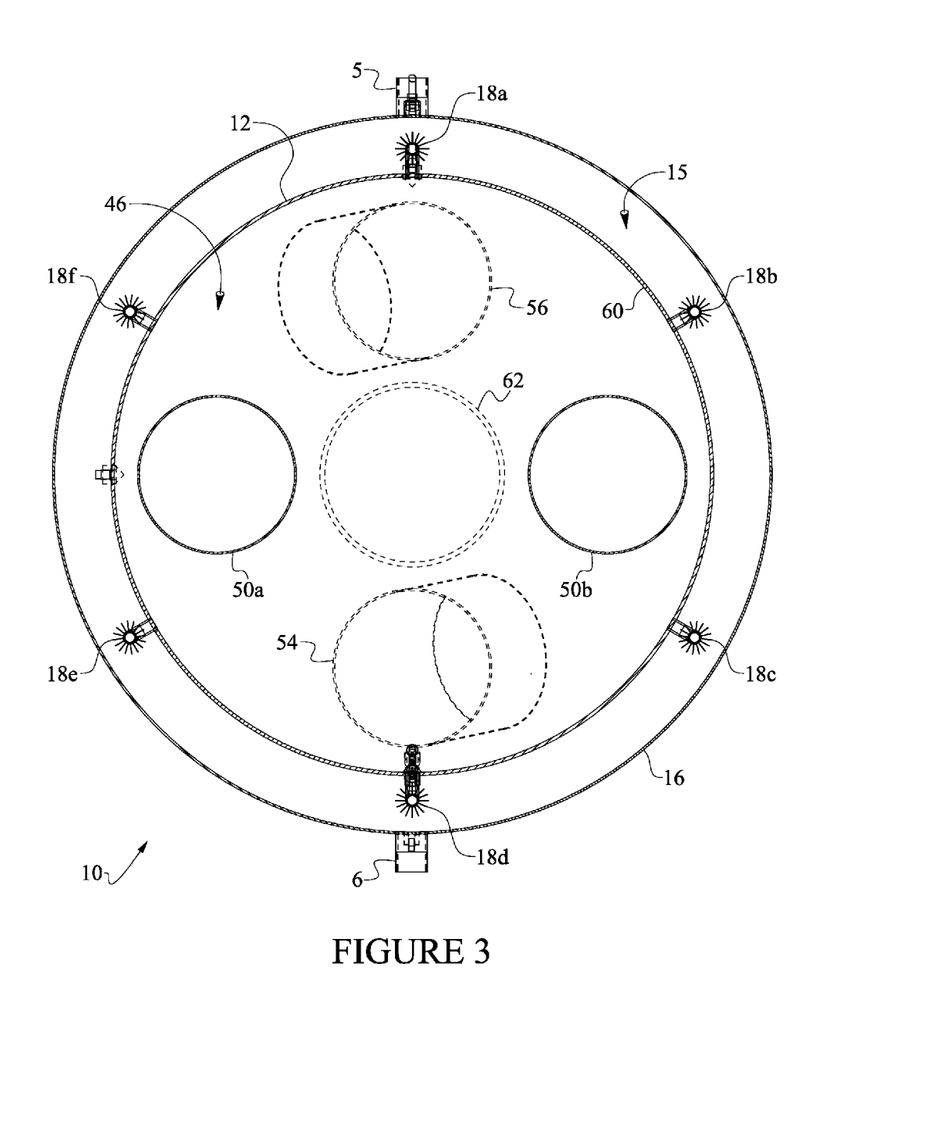
FIG. 3 depicts a cross sectional view of the heat recovery silencer of FIG. 1 along line A-A according to one or more embodiments.

FIGS. 2 and 3 show a heat recovery silencer 10 is depicted having an inner housing 12, a heat recovery outer housing 16, a heat recovery flow path 15 disposed or formed between the inner housing 12 and the heat recovery outer housing 16, a catalyst element 73, an access cover 74, a diffuser housing 57, a diffuser chamber 66, a diffuser inlet 59, and a diffuser 63. Although the heat recovery silencer 10 is depicted in a horizontal position, the heat recovery silencer 10 can be oriented in a position and mounted in multiple ways. For example, the heat recovery silencer 10 can be oriented in a vertical configuration. One skilled in the art with the aid of this disclosure would be able to mount and position the heat recovery silencer 10 in any number of ways without undue experimentation.

The heat recovery outer housing 16 can be concentric with the inner housing 12. The heat recovery outer housing 16 can at least partially encapsulate the inner housing 12. The heat recovery outer housing 16 can be made from steel, carbon steel, ceramic, or other material capable of withstanding high temperatures. The heat recovery outer housing 16 can have one or more ports (two are shown as 5 and 6) formed therethrough.

The inner housing 12 can have three or more silencing chambers (three are shown as 46, 48, and 52) formed or located therein. The first silencing chamber 46 can be in fluid communication with an exhaust source. For example, an inlet, such as a diffuser inlet 59, can be connected to the inner housing 12 and in fluid communication with the first silencing chamber 46. One or more components can be located between the diffuser inlet 59 and the first silencing chamber 46. The diffuser inlet 59 can be in direct fluid communication with the first silencer chamber 46.

The first silencing chamber 46 can also be in fluid communication with a second silencing chamber 48. For example, one or more baffle tubes (two are shown as 50a and 50b) can be in fluid communication with the first silencing chamber 46 and the second silencing chamber 48. The baffle tubes 50a and 50b can provide a flow path between the first silencing chamber 46 and the second silencing chamber 48.

The second silencing chamber 48 can be in fluid communication with a third silencing chamber 52. For example, one or more vectoring tubes (two are shown 54 and 56) can be in fluid communication with the second silencing chamber 48 and the third silencing chamber 52. The vectoring tubes 54 and 56 can provide a flow path between the second silencing chamber 48 and the third silencing chamber 52. The third silencing chamber 52 can be in fluid communication with a vent 62, which can be in fluid communication with an external environment.

The heat recovery flow path 15 can be a chamber, a channel, a space, a niche or other void between the inner housing 12 and the heat recovery outer housing 16. The heat recovery flow path 15 can be in fluid communication with the ports 5 and 6. The ports 5 and 6 can allow fluid to enter and exit the heat recovery flow path 15.

The inner housing 12 can have the catalyst element 73 disposed adjacent or connected thereto. The catalyst element 73 can include a catalyst housing 71 and a catalyst device disposed therein (as shown below in FIGS. 4A and 4B).

The diffuser housing 57 can be disposed adjacent and connected to the catalyst housing 71. The diffuser housing 57 can have a diffuser chamber 66 located therein. The diffuser chamber 66 can be in fluid communication with the first silencer chamber 46 and the diffuser inlet 59.

The diffuser 63, such as a conical diffuser, a baffle plate, a flow tube, or similar device that provides a velocity change to a flowing fluid or gas, can be located between the diffuser chamber 66 and the diffuser inlet 59. In one or more embodiments, the diffuser 63 can at least partially protrude into the diffuser chamber 66.

In operation, the diffuser inlet 59 can be placed in fluid communication with an exhaust of a combustion system 2. A high velocity exhaust gas stream 3 can flow from the exhaust of the combustion system 2 to the diffuser inlet 59.

The high velocity exhaust gas stream 3 can pass through the diffuser 63. The diffuser 63 can cause the velocity of the high velocity exhaust gas stream 3 to change. For example, the diffuser 63 can slow down and provide a direction change to the high velocity exhaust gas stream 3.

Accordingly, the high velocity exhaust gas stream 3 can be transformed to a low velocity exhaust gas stream 65 as it passes through the diffuser 63 and enters the diffuser chamber 66.

The low velocity exhaust gas stream 65 can flow through the diffuser chamber 66 into the catalyst housing 71. As the low velocity exhaust gas stream 65 passes through the catalyst housing 71.

The low velocity exhaust gas stream 65 can flow from the catalyst housing 71 to the first silencing chamber 46. A first portion 8 of the low velocity exhaust gas stream 65 can flow from the first silencing chamber 46 to the second silencing chamber 48 via the baffle tubes 50a and 50b. A second portion 9 of the low velocity exhaust gas stream 65 can flow from the first silencing chamber 50 to the third silencing chamber 52 through a conduit 18a, 18b, 18c, 18d, 18e, and 18f.

The first portion 8 of the low velocity exhaust stream 65 can flow from the second silencing chamber 48 to the third silencing chamber 52 via the vectoring tubes 54 and 56. As the first portion 8 of the low velocity exhaust gas stream 65 passes through vectoring tubes 54 and 56, the vectoring tubes 54 and 56 can impart a spiral flow to the first portion 8 of the low velocity exhaust gas stream 65 as it enters the third silencing chamber 52.

As such, back pressure and contact in the third silencing chamber 52 can be reduced in an inner surface 60 of the inner housing 12. The first portion 8 of the low velocity exhaust gas stream 65 entering the third silencing chamber 52 can be increased because of the reduction in back pressure and contact. The first portion 8 of the low velocity exhaust gas stream 65 can mix with the second portion 9 of the low velocity exhaust stream 65 in the third silencing chamber 52.

The first portion 8 and the second portion 9 of the low velocity exhaust gas stream 65 can exit the third silencing chamber 52 via the vent 62.

As the low velocity exhaust gas stream 65 flows through the inner housing 12, a heat transfer fluid, such as a diethylene glycol, a purified water, a triethylene glycol, a synthetic oil (300-600 F without degrading), a silicon fluid, a refrigerant, or other fluid, can enter the heat exchange flow path 15 via the right port 6 and flow to the left port 5.

As the heat transfer fluid flows from the right port 6 to the left port 5, indirect heat exchange can occur between the low velocity gas exhaust stream 65 and the heat transfer fluid. Accordingly, the heated heat transfer fluid 26, which can be a vapor or liquid, can exit the left port 5 and be provided to an end use.

Figure 4A:
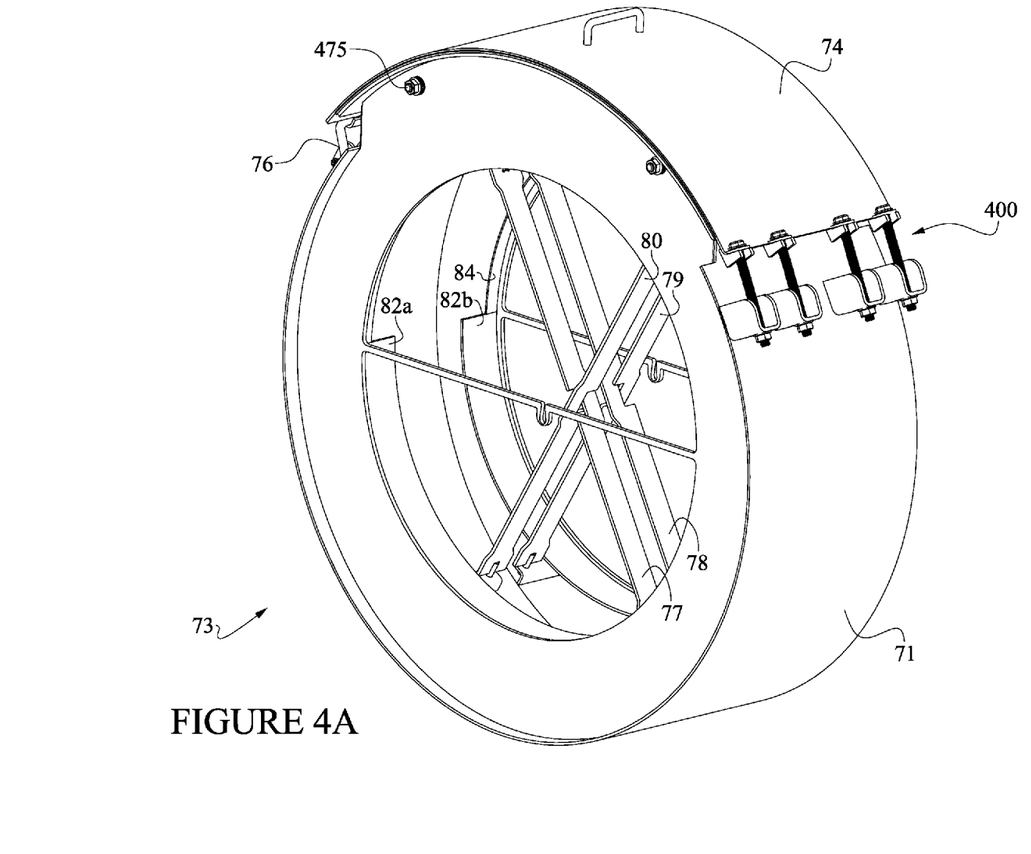
FIG. 4A depicts an illustrative catalyst housing usable with the heat recovery silencer according to one or more embodiments.
Figure 4B:
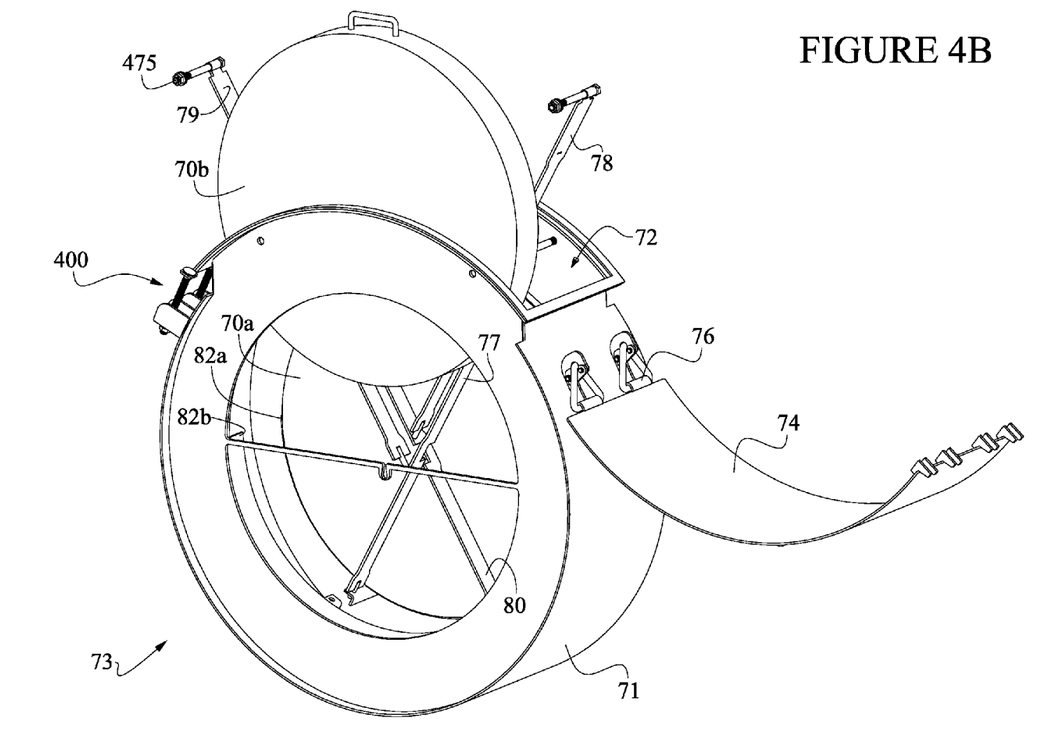
FIG. 4B depicts an illustrative view of the catalyst housing of FIG. 4A having a catalyst device disposed therein.

FIG. 4A depicts a catalyst housing 71 usable with the heat recovery silencer 10 according to one or more embodiments. FIG. 4B is a view of the catalyst element 73 having a catalyst devices 70a and 70b being disposed therein. In FIGS. 4A and 4B, the catalyst element 73 can include the catalyst housing 71. The catalyst housing 71 can include one or more seating rings (two are shown as 82a and 82b), one or more housing seal plates 84, an access cover 74, an opening 72, and at least four moveable pressure sealing bars 77, 78, 79, and 80.

The opening 72 can allow one or more catalyst devices 70a and 70b to be placed into the catalyst housing 71. The opening 72 can be blocked or sealed by the access cover 74. The access cover 74 can be mounted to the catalyst housing 71 by the hinge 76. When the access cover 74 seals the opening 72, a lock mechanism 400 can be used to secure the access cover 74 in place.

The catalyst element can sit on the seating rings 82a and 82b, and the seating rings 82a and 82b can ensure proper positioning of the catalyst devices 70a and 70b within the catalyst housing 71.

The at least four moveable pressure sealing bars 77, 78, 79, and 80 can be fixed at one end. The other end of the at least four moveable pressure sealing bars 77, 78, 79, and 80 can be moved to press one or more of the catalyst devices against the seal plate 84 by a tightening device 475. Accordingly, a pressure seal can be formed between the seal plate 84 and the catalyst devices.

Figure 5:
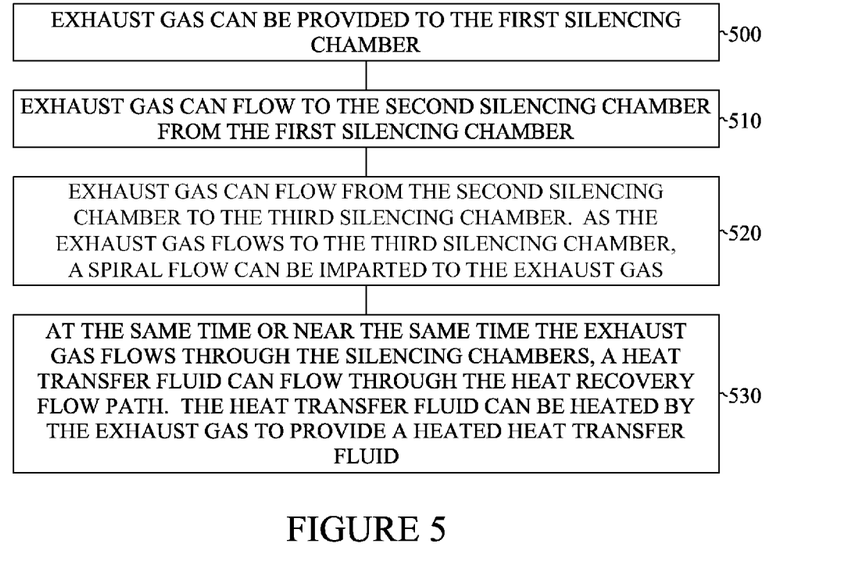
FIG. 5 depicts a flow diagram for an illustrative method of using the heat recovery silencer according to one or more embodiments.

FIG. 5 depicts a flow diagram for an illustrative method of using the heat recovery silencer according to one or more embodiments.

At box 500, exhaust gas can be provided to the first silencing chamber. At box 510, the exhaust gas can flow to the second silencing chamber from the first silencing chamber.

At box 520, the exhaust gas can flow from the second silencing chamber to the third silencing chamber. As the exhaust gas flows to the third silencing chamber, a spiral flow can be imparted to the exhaust gas.

At the same time or near the same time the exhaust gas flows through the silencing chambers, a heat transfer fluid can flow through the heat recovery flow path. The heat transfer fluid can be heated by the exhaust gas to provide a heated heat transfer fluid, as depicted at box 530. For example, the heat transfer fluid can be heated by the exhaust gas by indirect heat transfer.

While these embodiments have been described with emphasis on the embodiments, it should be understood that within the scope of the appended claims, the embodiments might be practiced other than as specifically described herein.

What is claimed is:

1. A method for generating shaft horsepower by using waste heat from combustion exhaust, wherein the method comprises:
   a. providing an exhaust gas from a combustion system to an inner housing of a heat recovery silencer, wherein the inner housing comprises a first silencing chamber, a second silencing chamber, wherein the second silencing chamber is in fluid communication with the first silencing chamber, and a third silencing chamber in fluid communication with the second silencing chamber via at least two vectoring tubes;
   b. flowing a heated vapor from a heat recovery flow path to a turbine, wherein the heated vapor is formed by heating a heat transfer fluid flowing in a space formed between the inner housing and a heat recovery outer housing of the heat recovery silencer, wherein heating the heat transfer fluid comprises:
      (i) transferring heat from a first portion of the exhaust gas to the heat transfer fluid, as the exhaust gas flows from the first silencing chamber to the second silencing chamber, from the second silencing chamber to the third silencing chamber, and from the third silencing chamber to a vent in fluid communication with the third silencing chamber and an environment exterior thereto; and
      (ii) simultaneously transferring heat from a second portion of the exhaust gas to the heat transfer fluid, wherein the second portion of the exhaust gas flows through one or more conduits, wherein the conduits receive the second portion of the exhaust gas from the first silencing chamber and deliver the second portion of the exhaust gas to the third silencing chamber, and wherein the conduits bypass the second silencing chamber; and wherein the conduits are connected with an exterior portion of the inner housing and located in the space formed between the inner housing and the heat recovery outer housing;
   c. expanding the heated vapor in the turbine to produce shaft horsepower and a low pressure vapor stream;
   d. forming the heat transfer fluid from the low pressure vapor stream;
   e. pumping the heat transfer fluid to the heat recovery flow path; and
   f. heating the heat transfer fluid with the exhaust gas to form the heated vapor.

2. The method of claim 1, further comprising a baffle tube in fluid communication with the first silencing chamber and the second silencing chamber.

3. The method of claim 1, further comprising changing speed and direction of the exhaust gas before the exhaust gas enters the inner housing.

4. The method of claim 3, further comprising catalytically reforming the exhaust gas before the exhaust gas enters the inner housing and subsequent to changing speed and direction of the exhaust gas.

5. The method of claim 1, wherein the turbine is a turbo expander.

6. The method of claim 1, wherein the heat transfer fluid comprises a treated water, a biomedia, a refrigerant, or combinations thereof.

7. The method of claim 6, wherein the biomedia is a propane, a butane, a heptane, a nonane, an octane, or combinations thereof.

8. The method of claim 6, wherein the treated water is a deionized water, water treated with corrosion inhibitors, or reverse osmosis water.

9. A method for generating shaft horsepower using waste heat from combustion exhaust, wherein the method comprises:
   a. providing an exhaust gas to a first silencing chamber within an inner housing of a heat recovery silencer;
   b. flowing a first portion of the exhaust gas from the first silencing chamber to a second silencing chamber within the inner housing and flowing a second portion of the exhaust gas from the first silencing chamber to the third silencing chamber in a conduit;
   c. flowing the first portion of the exhaust gas from the second silencing chamber to a third silencing chamber within the inner housing and imparting a spiral flow path to the first portion of the exhaust gas as the exhaust gas enters the third silencing chamber via at least two vectoring tubes;
   d. simultaneously transferring heat from the first portion of the exhaust gas in the inner housing to a heat transfer fluid in a heat recovery flow path formed between the inner housing and a heat recovery outer housing of the heat recovery silencer and from the second portion of the exhaust gas in the conduit, wherein the heat transfer changes the heat transfer fluid into a heated vapor;
   e. expanding the heated vapor into a low pressure vapor stream and producing shaft horsepower in a turbine;
   f. transforming the low pressure vapor stream back into heat transfer fluid; and
   g. recycling the heat transfer fluid back to the heat recovery flow path.

10. The method of claim 9, wherein the heat transfer fluid comprises a treated water, a biomedia, a refrigerant, or combinations thereof.

11. The method of claim 10, wherein the biomedia is a member of the group consisting of: a propane, a butane, a heptane, a nonane, an octane, and combinations thereof.

12. The method of claim 9, further comprising controlling a flow rate of the heated vapor to the turbine.

13. The method of claim 9, further comprising flowing at least a portion of the exhaust gas from the first silencing chamber to the third silencing chamber through a flow path exterior of the inner housing.

14. The method of claim 9, further comprising changing speed and direction of the exhaust gas prior to the exhaust gas entering the inner housing.

15. The method of claim 14, further comprising catalytically reforming the exhaust gas before the exhaust gas enters the inner housing and subsequent to changing the speed and direction of the exhaust gas.

16. A method for generating shaft horsepower by using waste heat from combustion exhaust, wherein the method comprises:
   a. flowing exhaust gas through a heat recovery silencer, wherein the heat recovery silencer comprises:
      (i) a heat recovery outer housing concentrically disposed about an inner housing, wherein a heat recovery flow path is formed between the inner housing and the heat recovery outer housing; and wherein the inner housing has a first silencing chamber, a second silencing chamber, and a third silencing chamber, wherein the exhaust gas enters the first silencing chamber, and wherein a first portion of the exhaust gas flows from the first silencing chamber to the second silencing chamber and from the second silencing chamber to the third silencing chamber, wherein the first portion of the exhaust gas flows from the first silencing chamber to the second silencing chamber via at least two vectoring tubes;
      (ii) a heat transfer fluid inlet formed through the heat recovery outer housing and in fluid communication with the heat recovery flow path proximate the third silencing chamber;
      (iii) a heat transfer fluid outlet formed through the heat recovery outer housing and in fluid communication with the heat recovery flow path proximate the first silencing chamber; and
      (iv) a conduit in communication with first silencing chamber and the third silencing chamber; wherein the conduit is configured to allow a second portion of the exhaust gas to flow from the first silencing chamber to the third silencing chamber and bypass the second silencing chamber, and wherein the conduit is in the heat recovery flow path;
   b. flowing a heat transfer fluid into the heat transfer fluid inlet and through the heat recovery flow path;
   c. simultaneously transferring heat from the first portion of the exhaust gas within the inner housing and the second portion of the exhaust gas in the conduit with the heat transfer fluid, forming a heated vapor;
   d. flowing the heated vapor out of the heat transfer fluid outlet;
   e. expanding the heated vapor with a turbine, producing shaft horsepower and forming a low pressure vapor stream; and
   f. transforming the low pressure vapor stream back to the heat transfer fluid.

* * * * *